No. 885,258. PATENTED APR. 21, 1908.
W. A. KENNEDY.
LISTER CULTIVATOR.
APPLICATION FILED JUNE 29, 1907.

2 SHEETS—SHEET 1.

Witnesses:
Frank R. Glore
H. C. Rodgers

Inventor:
William A. Kennedy
By George J. Thorpe
atty.

No. 885,258. PATENTED APR. 21, 1908.
W. A. KENNEDY.
LISTER CULTIVATOR.
APPLICATION FILED JUNE 29, 1907.
2 SHEETS—SHEET 2.
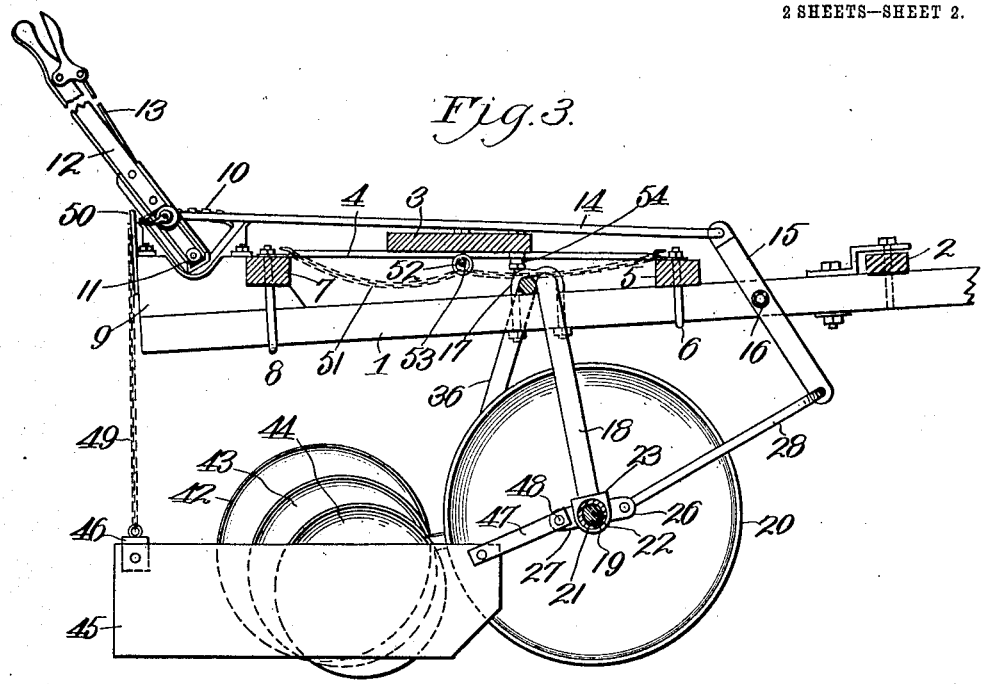

UNITED STATES PATENT OFFICE.

WILLIAM A. KENNEDY, OF KANSAS CITY, MISSOURI.

LISTER-CULTIVATOR.

No. 885,258.     Specification of Letters Patent.     Patented April 21, 1908.

Application filed June 29, 1907. Serial No. 381,534.

*To all whom it may concern:*

Be it known that I, WILLIAM A. KENNEDY, a citizen of the United States, residing at Kansas City, in the county of Jackson and State of Missouri, have invented certain new and useful Improvements in Lister-Cultivators, of which the following is a specification.

This invention relates to lister cultivators, and more especially to that type having ground wheels to run in the furrows and disks to turn soil into the furrows, and my object is to produce a machine of this character which operates efficiently and reliably and which can be manufactured at a comparatively low cost.

With this object in view the invention consists in certain novel and peculiar features of construction and organization as hereinafter described and claimed; and in order that it may be fully understood reference is to be had to the accompanying drawings, in which:—

Figure 1:
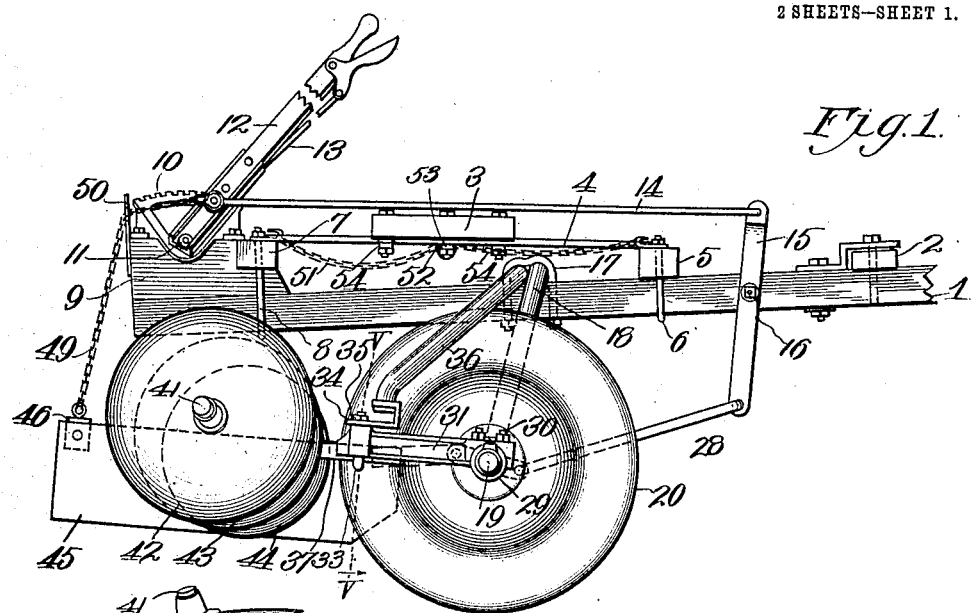
Figure 2:
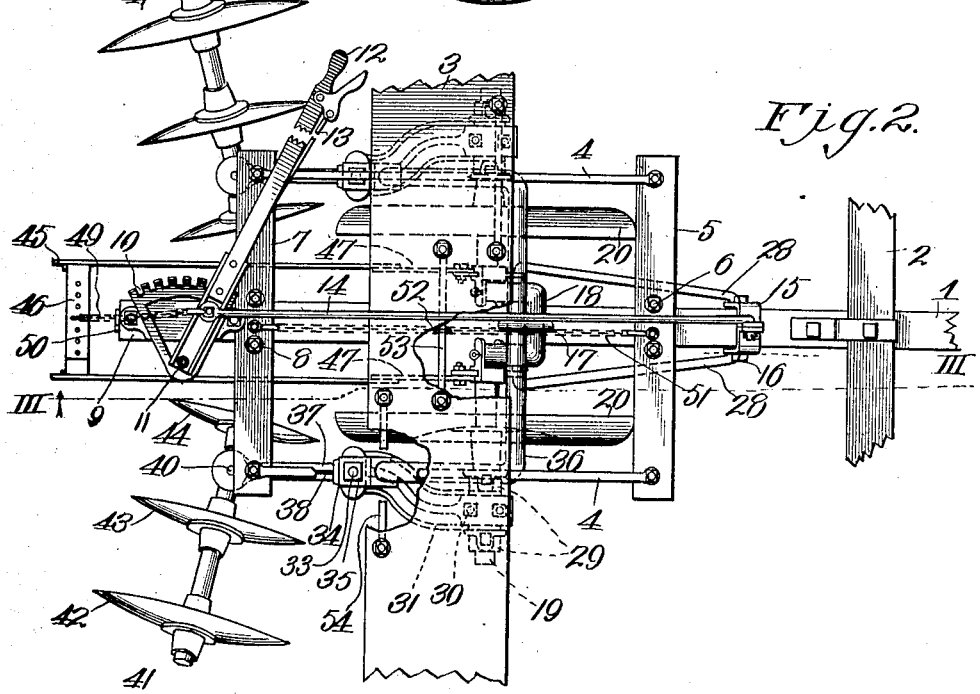

Figure 1, represents a side elevation of a two-row machine embodying the invention. Fig. 2, is a top plan view showing a single gang, and the seat-plank and lever broken away. Fig. 3, is a vertical section taken on the line III—III of Fig. 2. Fig. 4, is an enlarged horizontal section taken through the ground wheel arch and showing certain parts connected to the same. Fig. 5, is an enlarged section taken on the line V—V of Fig. 1. Fig. 6, is a vertical longitudinal section of one end of the axle and the parts carried thereby, looking forward.

In said drawings 1 indicates a frame or tongue, 2 the usual double-tree, and 3 the seat-plank for connecting the gangs of a double row machine, said seat-plank being supported on the parallel rods 4 of each gang, secured at their front ends to the cross-bar 5 fastened by bolts 6 to the tongue, and at their rear ends to cross-bar 7, fastened by bolts 8 to the block 9 bolted on the tongue.

10 is a toothed sector secured to block 9, and pivoted to said sector at 11 and extending upward therefrom and inwardly towards the driver's seat (not shown) on the seat-plank, is a lever 12 provided with latch mechanism 13 for engagement with the sector.

14 is a rod pivotally connecting the lever to the inverted U-shaped rock-bar 15 pivoted as at 16 to the tongue.

17 is an inverted U-bolt secured to the tongue and forming a journal for an arched axle 18, provided at its lower ends with outwardly projecting arms 19 on which are journaled ground wheels 20, hub portions 21 of the ground wheels projecting inwardly and engaging grooves 22 in the brackets 23 journaled on arms 19 and having bifurcations 24 receiving the body-portion of the arch, the brackets being secured to the arch by spring-cotters 25.

26 and 27 are lugs projecting forward and rearward respectively from brackets 23, and 28 is a U-shaped link pivotally connecting lug 26 with the lower end of rock frame 15.

29 are collars adjustable on arms 19, and secured rigidly on said arms between said collars by U-bolts 30, are rearwardly projecting arms 31, the rear ends of said arms being longitudinally channeled in their lower sides, as indicated in Fig. 5.

33 are eye-bolts extending up through arms 31 and forming pivots for links 34 surmounting arms 31, nuts 35 engaging said bolts to retain the links in position.

36 indicates an arched brace journaled in bolt 17 and having its bridge portion paralleling the corresponding portion of arch 18 and having its arm diverging downward with respect to arch 18 and pivoted at its lower end to links 34; said links being adapted to assume varying angles with relation to the tongue when the arms 31 are adjusted outward or inward on arms 19 to permit the ground wheels to be moved a greater distance apart or closer together, and also for inward or outward adjustment of the cultivating devices.

37 indicates cylindrical arms fitting in the hollowed or channeled sides of arms 31 and provided with longitudinal ribs 38 to engage one or another of the longitudinal grooves 39 in the rear ends of said arms 31; said arms 37 also extending through the eye-bolts 33 to be clamped by the latter at the desired point of adjustment in arms 31, either longitudinal or rotatable, the engagement of the ribs 38 with grooves 39 guarding against accidental turning movement of the arms 37. Pivoted as at 40 to the ends of arms 37 are shafts 41, the usual means (not shown) being employed to secure said shafts at the desired angle with respect to said arms, and journaled on said shafts are disks, preferably series of disks 42, 43 and 44 of diminishing diameter respectively.

45 indicates a fender arranged between the two series of disks and vertically below the tongue, the sides of the fender being connected at their rear ends by a pair of bars 46 adjustably secured together. 47 are links pivotally connecting the front end of the fender to the rearwardly projecting lugs 27 of brackets 23, as shown at 48.

49 indicates a cable or chain secured at its lower end to cross-piece 46, and at its upper end to the lever 12 and extending through an apertured guide-bar 50 projecting upwardly from block 9.

51 indicates a chain connecting bars 5 and 7, and equipped about mid-way its length with a ring 52 engaging a rod 53 carried by and extending longitudinally of and below the seat-plank, and also extending longitudinally of and below the seat-plank are bars 54; said bars also underlying rods 4 to prevent either end of the seat-plank tilting upward from any cause.

In practice the parts are arranged as shown in Fig. 1 when the machine is driven to or from a field, in which position it will be noticed that the weight of the machine is practically balanced on the ground wheels and that, when the lever is thrown forward, it not only pushes the ground wheels rearward and raises the disks but likewise elevates the fender and the brace 36. When the cultivating operation is to take place, the lever is thrown rearward, as indicated in Fig. 3, this action through the connections described, causing the ground wheels 20 to roll forward and rock arch 18 and brace 36 until the disks come into engagement with the ground, the fender at the same time assuming its proper position upon the ground with relation to the plants (not shown). In the cultivating operation the arch 36 acts as a brace to hold the disks firmly embedded at the required depth, and at the same time the connection between the arch 36 and arms 31 permits of lateral adjustment of the ground wheels and a variation of distance between the disks. The end-wise movement of the seat-plank does not interfere with the operation of the machine and is limited by the bars 54, and the forward and back movement of the seat-plank is limited by the front and rear sections of chain 51, as will be readily understood. The cultivator can be used as a single or double row, and will work equally as well for the second or third cultivation.

From the above description it will be apparent that I have produced a cultivator embodying the features of advantage enumerated as desirable, and which obviously may be equipped with a single disk at each side in lieu of the series of disks and also with shovels if desired.

Having thus described the invention what I claim as new and desire to secure by Letters Patent, is:—

1. A lister cultivator comprising a tongue, an arched axle journaled thereon and equipped with ground wheels, laterally adjustable arms projecting rearward from said axle, disks suitably journaled and movable with said arms, an arched brace journaled on the tongue and extending divergently downward with respect to the axle, and links pivotally connecting the arched brace and said arms; said links being pivoted for movement at right angles to the pivotal movement of the arched brace on the tongue, to accommodate lateral adjustment of said arms toward or from each other.

2. A lister cultivator, comprising a tongue, an arched axle journaled thereon and equipped with ground wheels, arms projecting rearward from the axle, disks suitably journaled and movable with said arms, an arched brace between the tongue and said arms and extending divergently downward with respect to the axle, a rock frame mounted on the tongue and linked to the axle, a lever linked to said frame, a toothed sector, and catch mechanism carried by the lever for engagement with the sector.

3. A lister cultivator, comprising a tongue, an arched axle journaled thereon and equipped with ground wheels, arms projecting rearward from the axle, disks suitably journaled and movable with said arms, an arched brace between the tongue and said arms and extending divergently downward with respect to the axle, a rock frame mounted on the tongue and linked to the axle, a lever linked to said frame, a toothed sector, catch mechanism carried by the lever for engagement with the sector, a fender between the disks and linked to the axle, and a suitably guided flexible connection between the lever and the rear end of the fender.

4. A lister cultivator comprising a suitable frame, an arched axle journaled thereon and equipped with ground wheels, arms projecting rearward from said axle, cultivating appliances supported at the rearward ends of said arms, an arched brace journaled at its arched point on the frame to swing in a vertical plane and extending downwardly and rearwardly with respect to the axle, and links for operation in a plane substantially horizontal and pivotally connected at their opposite ends to the lower ends of the arched brace and the rear ends of said arms.

In testimony whereof I affix my signature, in the presence of two witnesses.

WILLIAM A. KENNEDY.

Witnesses:
H. C. RODGERS,
G. Y. THORPE.